United States Patent
Chen

(10) Patent No.: US 8,090,362 B2
(45) Date of Patent: Jan. 3, 2012

(54) MOBILE ELECTRONIC DEVICE AND METHOD FOR DISPLAYING CHARACTERS ON A BLUETOOTH DEVICE

(75) Inventor: Cho-Jan Chen, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 371 days.

(21) Appl. No.: 12/467,289

(22) Filed: May 17, 2009

(65) Prior Publication Data

US 2010/0009630 A1    Jan. 14, 2010

(30) Foreign Application Priority Data

Jul. 11, 2008 (CN) .......................... 2008 1 0302702

(51) Int. Cl.
*H04M 3/42* (2006.01)
(52) U.S. Cl. ....................................................... 455/415
(58) Field of Classification Search .................. None
See application file for complete search history.

(56) References Cited

U.S. PATENT DOCUMENTS

2006/0116114 A1* 6/2006 Kadado .......................... 455/415
2006/0129632 A1* 6/2006 Blume et al. .................. 709/203

* cited by examiner

*Primary Examiner* — Lincoln Donovan
*Assistant Examiner* — Sibin Chen
(74) *Attorney, Agent, or Firm* — Altis Law Group, Inc.

(57) ABSTRACT

A system and method for displaying characters on a BLUETOOTH device using a mobile electronic device obtains a telephone number of an incoming call, and converts associated one or more characters into a bitmap picture in response to a determination that the telephone number is associated with one or more characters in a character encoding packet. The system and method further reads a resolution of the bitmap picture and a resolution of a display of the BLUETOOTH device, and adjusts the resolution of the bitmap picture to match the resolution of the display of the BLUETOOTH device. Furthermore, the system and method sends the bitmap picture or the telephone number to the BLUETOOTH device, and displays the bitmap picture on the display of the BLUETOOTH device.

9 Claims, 2 Drawing Sheets

MOBILE ELECTRONIC DEVICE AND METHOD FOR DISPLAYING CHARACTERS ON A BLUETOOTH DEVICE

BACKGROUND

1. Technical Field

Embodiments of the present disclosure are related to electronic device management systems and methods, and particularly to a system and method for displaying characters on a BLUETOOTH device using a mobile electronic device.

2. Description of Related Art

A mobile electronic device is a pocket-sized computing device, which usually includes a small visual display for output, and a miniature keyboard or touch screen for input. Currently, some mobile electronic devices utilize a BLUETOOTH device (e.g., BLUETOOTH headset) for additional function. Usually, the BLUETOOTH device stores a character encoding packet. The character encoding packet includes a character set and encode value of each character. For example, a character, such as an integer number, is encoded as a series of bits. However, the character encoding packet may comprise many bits, thus occupying much storage space in the BLUETOOTH device.

Therefore, there is a need for a system and method to overcome the aforementioned problem.

DETAILED DESCRIPTION

All of the processes described below may be embodied in, and fully automated via, function modules executed by one or more general purpose processors of a mobile electronic device. Some or all of the methods may alternatively be embodied in specialized hardware. The function modules may be stored in any type of computer-readable medium or other computer storage device.

Figure 1:
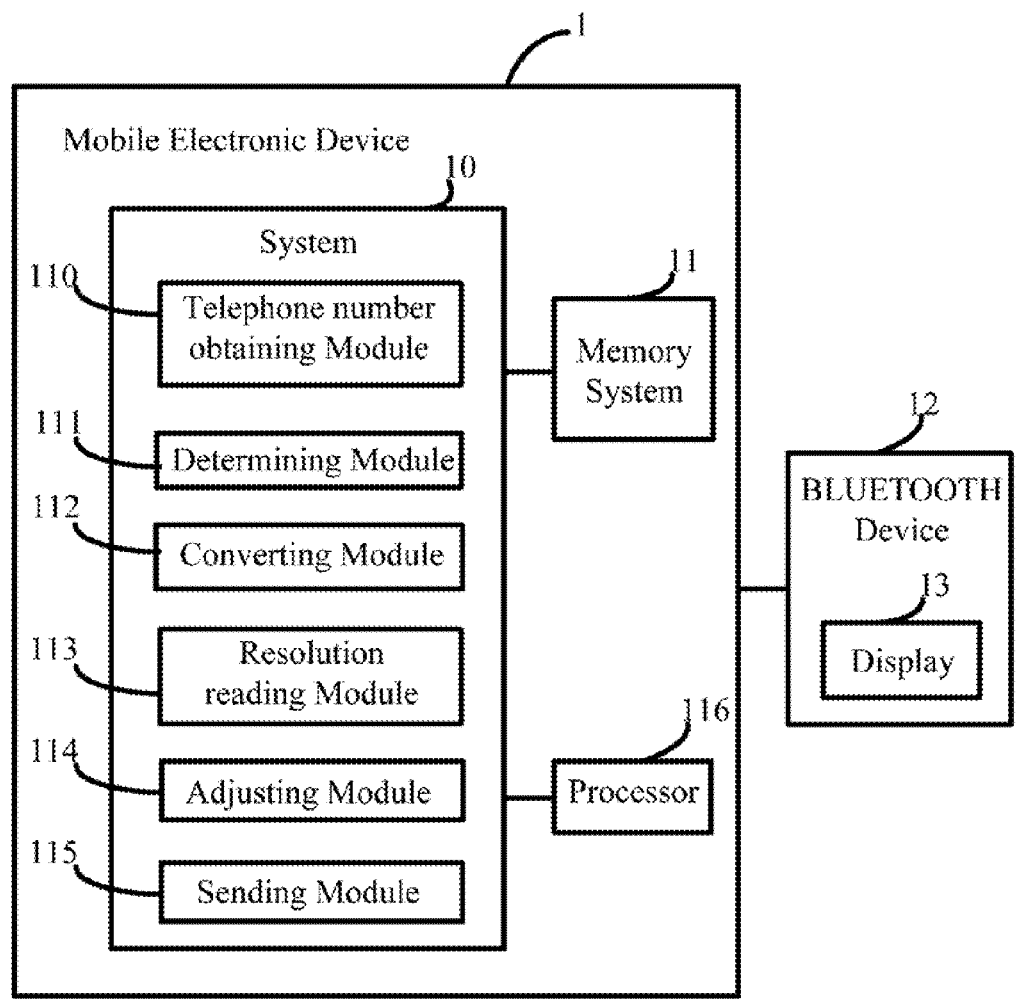
FIG. 1 is a block diagram of one embodiment of a mobile electronic device comprising a system for displaying characters on a BLUETOOTH device.

FIG. 1 is a block diagram of one embodiment of a mobile electronic device 1 comprising a system 10. The system 10 may be used to display characters on a BLUETOOTH device. In one embodiment, the mobile electronic device 1 includes a memory system 11. The memory system 11 stores a character encoding packet of the mobile electronic device. The character encoding packet may be, but not limited to, a 16-bit Unicode Transformation Format (UTF-16) packet, an 8-bit Unicode Transformation Format (UTF-8) packet, or a 2-byte Universal Character Set (USC-2) packet. The mobile electronic device 1 may communicate with the BLUETOOTH device 12 wirelessly (e.g., over a BLUETOOTH connection). In this embodiment, the BLUETOOTH device 12 comprises a display 13. The BLUETOOTH device 12 may be, but not limited to, a handset or any other portable electronic device with a BLUETOOTH function.

The memory system 11 may be an internal memory system card or an external memory system card, such as a smart media card (SMC), a secure digital card (SDC), a compact flash card (CFC), a multi media card (MMC), a memory system stick (MS), an extreme digital card (XDC), or a trans flash card (TFC). Depending on the embodiment, the mobile electronic device 1 may be a mobile phone, or a personal digital assistant (PDA), among other portable electronic devices with a communication function.

In one embodiment, the system 10 includes a telephone number obtaining module 110, a determining module 111, a converting module 112, a resolution reading module 113, an adjusting module 114, and a sending module 115. Computerized codes of the modules 110-115 are stored in the memory system 11. One or more general purpose or specialized processors, such as a processor 116 executes the computerized codes of the modules 110-115 to provide one or more operations of the system 10.

The telephone number obtaining module 110 is operable to obtain a telephone number of an incoming call.

The determining module 111 is operable to determine if the telephone number is associated with one or more characters in the character encoding packet. In one embodiment, the telephone number may be associated with one or more characters by a user. For example, if the telephone number is "1234567," the telephone number may be associated with the characters "Home" by the user.

The converting module 112 is operable to convert the associated one or more characters into a bitmap picture in response to a determination that the telephone number is associated with the one or more characters in the character encoding packet. In one embodiment, the converting module 112 converts the characters "Home" into a bitmap picture.

The resolution reading module 113 is operable to read a resolution of the bitmap picture and a resolution of the display of the BLUETOOTH device 12.

The adjusting module 114 is operable to adjust the resolution of the bitmap picture to match the resolution of the display 13 of the BLUETOOTH device 12. In one embodiment, if the resolution of the bitmap picture is 10*10 pixels, and the resolution of the display 13 of the BLUETOOTH device 12 is 20*20 pixels, then the adjusting module 114 adjusts the resolution of the bitmap picture to 20*20 pixels.

The sending module 115 is operable to send the bitmap picture or the telephone number of the incoming call to the BLUETOOTH device 12, so as to display the bitmap picture or the telephone number of the incoming call on the display 13 of the BLUETOOTH device 12. In one embodiment, the sending module 115 sends the bitmap picture or the telephone number of the incoming call to the BLUETOOTH device 12 wirelessly (e.g., over a BLUETOOTH connection).

Figure 2:
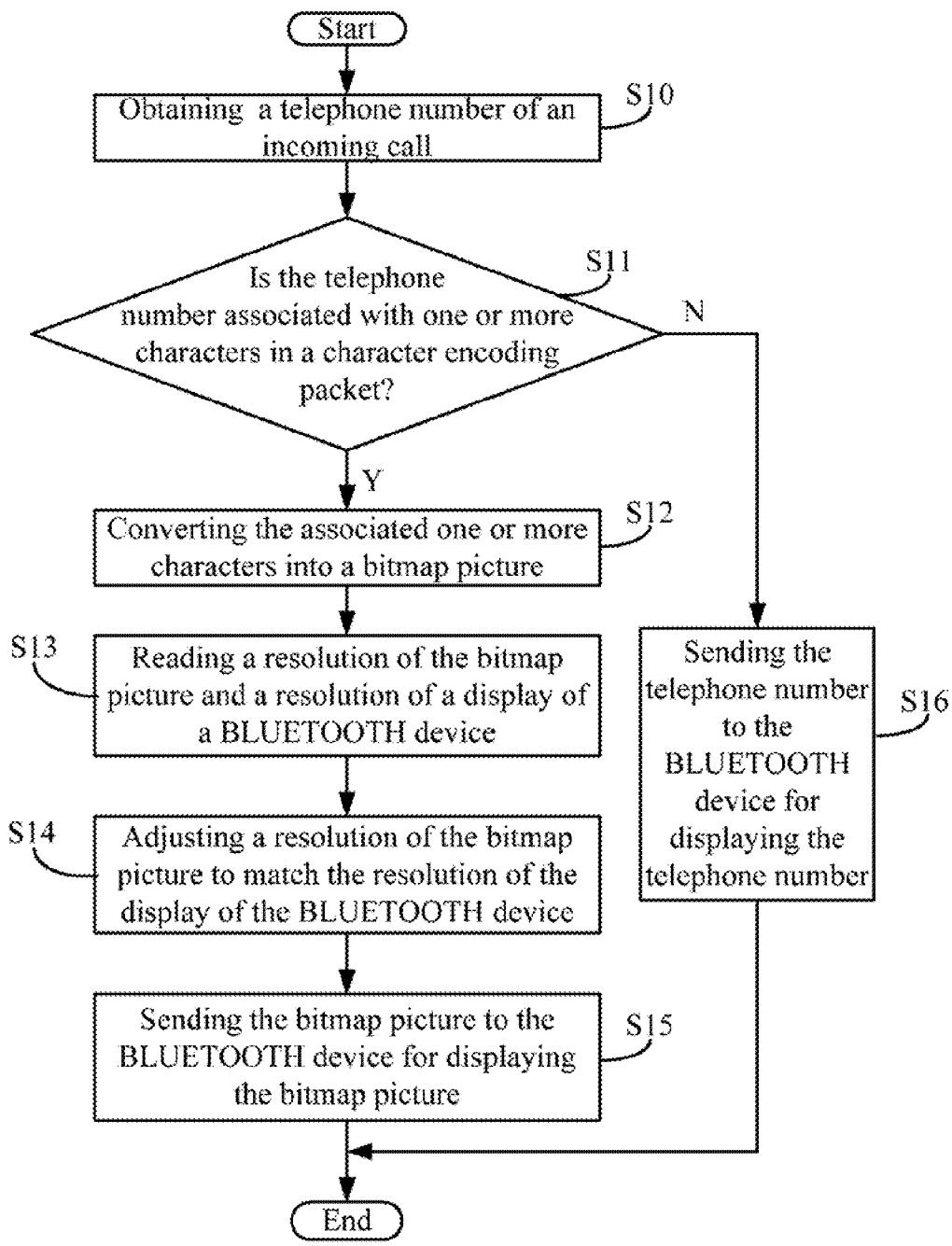
FIG. 2 is a flowchart of one embodiment of a method for displaying characters in the BLUETOOTH device using the mobile electronic device.

FIG. 2 is a flowchart of one embodiment of a method for displaying characters on the BLUETOOTH device 12 using the mobile electronic device 1. Depending on the embodiment, additional blocks may be added, while others deleted, and the blocks may also be executed in a different order than described.

In block S10, the telephone number obtaining module 110 obtains a telephone number of an incoming call.

In block S11, the determining module 111 determines if the telephone number associates with one or more characters in a character encoding packet stored in the memory system 11. As mentioned above, the telephone number may be associated with one or more characters by a user. For example, if the telephone number is "1234567," the telephone number may be associated with the characters "Home" by the user. If the telephone number "1234567" is associated with one or more characters "Home" in the character encoding packet, then the procedure goes to block S12. Otherwise, the procedure goes to block S16, the sending module 114 sends the telephone number of the incoming call to the BLUETOOTH device 12 directly, so as to display the telephone number on the display 13 of the BLUETOOTH device 12. As mentioned above, the sending module 115 sends the telephone number to the BLUETOOTH device 12 wirelessly (e.g., over a BLUETOOTH connection).

In block S12, the converting module 112 converts the associated one or more characters into a bitmap picture in response to a determination that the telephone number is associated with the one or more characters in the character encoding packet. As mentioned above, the converting module 112 converts the characters "Home" into a bitmap picture.

In block S13, the resolution reading module 113 reads a resolution of the bitmap picture and a resolution of the display 13 of the BLUETOOTH device 12.

In block S14, the adjusting module 114 adjusts the resolution of the bitmap picture to match the resolution of the display 13 of the BLUETOOTH device 12. In one embodiment, if the resolution of the bitmap picture is 10*10 pixels, and the resolution of the display 13 of the BLUETOOTH device 12 is 20*20 pixels, then the adjusting module 114 adjusts the resolution of the bitmap picture to 20*20 pixels.

In block S15, the sending module 114 sends the bitmap picture to the BLUETOOTH device 12, so as to display the bitmap picture on the display 13 of the BLUETOOTH device 12. As mentioned above, the sending module 115 sends the bitmap picture to the BLUETOOTH device 12 wirelessly (e.g., over a BLUETOOTH connection).

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile electronic device for displaying characters on a BLUETOOTH device, the mobile electronic device comprising a memory system storing a plurality of programs and a processor that executes one or more operations for the plurality of programs, the programs comprising:
   a telephone number obtaining module operable to obtain a telephone number of an incoming call;
   a determining module operable to determine if the telephone number is associated with one or more characters in a character encoding packet that is pre-stored in the memory system of the mobile electronic device, wherein the character encoding packet is an 8-bit Unicode Transformation Format (UTF-8) packet;
   a converting module operable to convert the associated one or more characters into a bitmap picture in response to a determination that the telephone number is associated with the one or more characters in the character encoding packet;
   a resolution reading module operable to read a resolution of the bitmap picture and a resolution of a display of the BLUETOOTH device;
   an adjusting module operable to adjust the resolution of the bitmap picture to match the resolution of the display of the BLUETOOTH device; and
   a sending module operable to send the bitmap picture or the telephone number to the BLUETOOTH device, so as to display the bitmap picture or the telephone number on the display of the BLUETOOTH device.

2. The mobile electronic device of claim 1, wherein the mobile electronic device is selected from the group consisting of a mobile phone, and a personal digital assistant (PDA).

3. The mobile electronic device of claim 1, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

4. A method for displaying characters on a BLUETOOTH device using a mobile electronic device, the method comprising:
   (a) obtaining a telephone number of an incoming call;
   (b) determining if the telephone number is associated with one or more characters in a character encoding packet that is pre-stored in a memory system of mobile electronic device, wherein the character encoding packet is an 8-bit Unicode Transformation Format (UTF-8) packet;
   (c) sending the telephone number to the BLUETOOTH device so as to display the telephone number on a display of the BLUETOOTH device, in response to a determination that the telephone number is not associated with the one or more characters in the character encoding packet;
   (d) converting the associated one or more characters into a bitmap picture in response to a determination that the telephone number is associated with the one or more characters in the character encoding packet;
   (e) reading a resolution of the bitmap picture and a resolution of the display of the BLUETOOTH device;
   (f) adjusting the resolution of the bitmap picture to match the resolution of the display of the BLUETOOTH device; and
   (g) sending the bitmap picture to the BLUETOOTH device, so as to display the bitmap picture on the display of the BLUETOOTH device.

5. The method of claim 4, wherein the mobile electronic device is selected from the group consisting of a mobile phone, a personal digital assistant (PDA), and a Palm computer.

6. The method of claim 4, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

7. A storage medium having stored thereon instructions that, when executed by a mobile electronic device, causes the mobile electronic device to perform a method for displaying characters on a BLUETOOTH device using a mobile electronic device, the method comprising:
   (a) obtaining a telephone number of an incoming call;
   (b) determining if the telephone number is associated with one or more characters in a character encoding packet that is pre-stored in a memory system of the mobile electronic device, wherein the character encoding packet is an 8-bit Unicode Transformation Format (UTF-8) packet;
   (c) sending the telephone number to the BLUETOOTH device so as to display the telephone number on a display of the BLUETOOTH device, in response to a determination that the telephone number is not associated with the one or more characters in the character encoding packet;
   (d) converting the associated one or more characters into a bitmap picture in response to a determination that the telephone number is associated with the one or more characters in the character encoding packet;
   (e) reading a resolution of the bitmap picture and a resolution of the display of the BLUETOOTH device;

(f) adjusting the resolution of the bitmap picture to match the resolution of the display of the BLUETOOTH device; and
(g) sending the bitmap picture to the BLUETOOTH device, so as to display the bitmap picture on the display of the BLUETOOTH device.

8. The medium of claim 7, wherein the mobile electronic device is selected from the group consisting of a mobile phone, a personal digital assistant (PDA), and a Palm computer.

9. The medium of claim 7, wherein the memory system is selected from the group consisting of a smart media card (SMC), a secure digital card (SDC), a compact flash card (CFC), a multi media card (MMC), a memory system stick (MS), an extreme digital card (XDC), and a trans flash card (TFC).

* * * * *